8503X
Whitson & Hayne,
Cook Stove.
Patented Nov. 19. 1834.
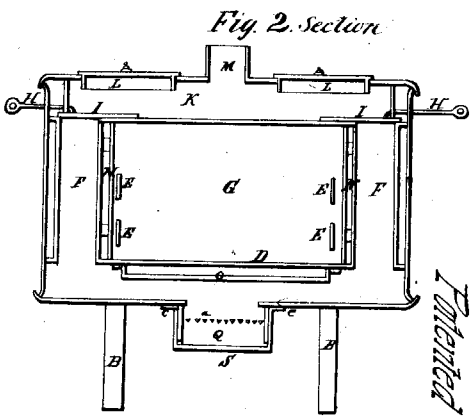
Fig. 2. Section
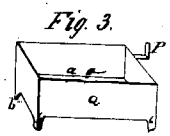
Fig. 3.
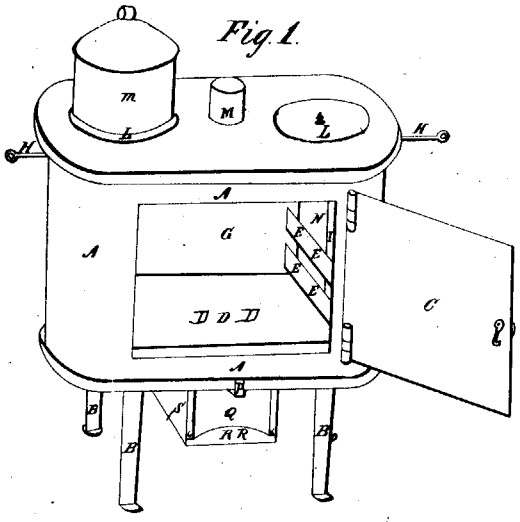
Fig. 1.

11/19/1834 [illegible]

Nov. 19. 1834 133.

Thomas Whitton & Gustavus Edwin Haynes.

The schedule referred to in these Letters Patent, and making part of the same, containing a description in the words of the said Thomas Whitton and Gustavus Edwin Haynes, themselves, of their improvement in the construction of Cooking Stoves, called the Portable Cooking Stove.

To all to whom these presents shall come — Thomas Whitton, Grate and stove maker, and Gustavus Edwin Haynes. Tin plater. both of Roxbury. in the County of Norfolk. and Commonwealth of Massachusetts Send Greeting —

Be it known, that we the said Whitton and Haynes. have invented, made, constructed, and applied to use, a new and useful improvement in the construction of Cooking Stoves. which we denominate the portable Cooking Stove — which said invention and improvement we specify, and describe as follows namely.

The drawing hereto annexed contains a delineation of our said improvement, Figure numbered One. represents a perspective view thereof. Figure numbered two. represents a sectional view of the same. Figure numbered three. represents the grate herein after described. The same letters in the different figures represent the same parts as far as they are shown. A.A.A. represents the body of the stove B.B.B. represents the legs by which the stove is supported. C. represents the door of the Oven, D.D.D. is the top of the lower chamber, E.E. are bars placed across each end of the oven, upon which bars may be placed other bars lengthwise of the oven upon which the articles are placed while cooking. F.F. are hollow pipes for conveying the heat and smoke from the lower chamber, into the upper chamber, G. is the [illegible] of the stove. H.H. are the handles connected with two dampers I.I. which are used to prevent. as may be required. the heat from ascending into the upper chamber. K K. is the upper chamber. L L. are openings in which boilers are to be placed, and in figure numbered one M. represents a boiler placed in one of them. M. represents the funnel through which the smoke escapes. N N. represents fenders of sheet Iron or other suitable material placed within the oven per-pendicularly against said pipe and fastened thereto by means of projections or flanges used to prevent the heat from striking too suddenly on the food while cooking, and to diffuse the heat over the oven. O. is a fender of sheet iron or other suitable material, placed near the top of the lower chamber and riveted or fastened to the sides of the chamber to prevent the heat from striking too sud-denly against the bottom of the oven, and to cause the oven to be heated more uniformly. P is the handle connected with the grate Q Q. which contains the fire. The grate is composed of cast iron with bars. a. a. placed in the bottom sufficiently near each other to prevent the fire from falling through it. and yet to permit the ashes to escape. The grate is rectangular and has four legs. t. t. upon which it is supported. On the front there is an opening R R. to allow of a draft of air. with the exception of the draft above named. the whole grate is made to fit into the receiver or pan S S. which is placed underneath the body of the stove. and nearly in the middle thereof, and is used to receive the ashes from the coal or wood. The receiver or ashpan by means of flanges c. c. is fastened to the bottom of the body of the stove. There is also an aperture in the bottom of the stove directly over the place where the receiver or ashpan is fastened thereto. and communi-cating with the lower chamber. This aperture is about half the whole length of the grate from the side of the stove. The body of the stove may be cylindrical. cubical, rectangular or oval. and of any convenient size. It may be made of sheet iron or polished tin, or other suitable materials. we prefer polished tin. The ordinary size which would be required is twenty four inches long. fourteen wide. and fourteen high. The legs are of iron
or other suitable material. and are joined across the bottom of the stove
in order to give strength and firmness to it. and are about ten inches
long. The receiver or ash pan of a stove of the dimensions before named
is nine and one quarter inches long. and five and one quarter wide
and five and one half deep. and is placed as near as may be in
the center of the bottom of the stove. so that the mouth thereof
shall be nearly even with the fronts of said stove. In larger
or smaller sizes it should be made in proportion. it is made
of stiff sheet iron or other suitable material. The grate is of
cast iron. and for a stove of the above size should be made
nine inches long. five wide. and three and a half deep. and
resting on four legs or supports. and when placed within the
receiver or pan, should be made with the exception of the
opening, for a draft to close the whole front of the pan. The
bottom chamber occupies the whole space between the bottom
of the oven and the bottom of the stove, excepting that a very
small space about one inch wide, may be left in the front
and rear of the oven. for the purpose of fastening it to the
bottom of the stove. The lower chamber in the size above named
is two and one half inches deep. The oven occupies the whole
space between the two chambers excepting what is occupied by
the two pipes. This is ten inches deep. any number of bars may
be placed across each end of the stove that may be required.
and on these. other bars are laid lengthwise of the oven on
which the food required to be cooked is placed. The pipes pass
from one chamber to the other. and may be either cylindrical.
oval. or of any other suitable shape. We prefer those that are
oval, as we think they occupy less space. and in other respects
answer the purpose equally well. In the size before mentioned
the pipes are four inches in diameter. and ten inches long. The
upper chamber occupies all the space between the top of the oven and the top of the stove, and in the size above mentioned, is
about two and a half inches deep. The fenders N. N. are five
inches wide, and extend nearly to the top of the pipes to which
they are fastened. The fender O. which prevents the heat from
coming directly against the bottom of the oven, is four and a half
inches wide, and six inches long, and is fastened at each end
to the sides of the oven, the ends being turned up so as to leave
a space between it, and the bottom of the oven. The dampers are
made of sufficient size, and are so constructed and placed in
the upper chamber a. when closed, to cover entirely the two pipes.
The openings for the boilers are about nine inches in diameter in
a stove of the size above described, and when no boilers are used
the openings are stopped by a sheet iron or other covering, and when
the stove is not wanted for boiling, it may be made without
the openings. The smoke pipe is about four and a half inches
in diameter. The door of the oven is sixteen inches long, nine
and a half inches high, and is made to turn on hinges, and
to close entirely the mouth of the oven. The aperture in the
bottom of the stove, is four and a half inches wide, and six
inches long. We do not however restrict ourselves to the partic
ular dimensions herein before named, we believe however,
that for the size mentioned, the different parts are well propor
tioned, and that they should be made larger or smaller,
according to the size of the stove to be used. When the stove
is made of polished tin, or other polished material, it re-
tains almost all the heat within itself, but when made of sheet
iron, or other material not polished, the heat passes off, and
would warm or heat the apartment in which it is placed.
The different parts of the stove are put together by means of
rivets or seams in such a manner, that the heat will not separate
them. The above stove is calculated for the burning of charcoal
bituminous or anthracite coal or wood, when the latter is used the grate is dispensed with and a door with a suitable opening
for a draft may be used to close the receiver or ash-pan. The coal
is placed in the grate, and the heat and smoke produced by the
burning thereof passes through the aperture in the bottom of the
stove, and the heat strikes against the fender O. and from that
is radiated and diffused over the whole of the surface of the
lower chamber. The fender O. is placed only directly over the
grate and is open on both sides, so as to permit the heat to
pass between it, and the top of the lower chamber. This will
produce sufficient heat to bake or cook any articles of food
placed in the oven, and will produce an uniform heat.
so that the food will be baked or cooked uniformly throughout,
The smoke and heat also pass from the lower chamber through
the pipes, nearly over the two pipes are placed the openings
for the boilers. These openings are placed a little nearer
the smoke pipe, than the two pipes, because the smoke
and fire are rushing towards the funnel to escape. The
object of the dampers, is to permit all the smoke and heat
from the fire, to pass under one boiler, when only one is
required, or by shutting both after the fire has burnt down
to retain the whole heat. The smoke and waste heat are carr-
-ied off in the smoke pipe, which by means of a common fun-
-nel may be made to communicate with a chimney or the
open air.

Although we have described the different parts of
the said stove, yet we do not claim the different parts thereof
seperately, as new, but what we claim as new and our inven-
-tion and discovery, is, the construction and arrangement of
the whole of said stove, and its different parts in the con-
-nection and combination, and for the purposes aforesaid —

In testimony that the above is a true specification
of our said improvement as above described. We have hereto Set our hands this thirteenth day of November in the year of our Lord One thousand eight hundred and thirty-four.

Witnesses

Geo. A. H. Fiske } Thomas Whitson

Wm. Francis Gardner Jr. } Gustavus A. Haynes.

Drawing 2 sheets

Patented November 19th 1834